United States Patent
Scamardo (10) Patent No.: US 12,479,201 B2
(45) Date of Patent: Nov. 25, 2025

(54) FORMING PATTERN FOR CELLULAR CORE BY FOLDING MATERIAL

(71) Applicant: Rohr, Inc., Chula Vista, CA (US)

(72) Inventor: Michael A. Scamardo, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 199 days.

(21) Appl. No.: 18/218,789

(22) Filed: Jul. 6, 2023

(65) Prior Publication Data

US 2024/0009985 A1 Jan. 11, 2024

Related U.S. Application Data

(60) Provisional application No. 63/359,559, filed on Jul. 8, 2022.

(51) Int. Cl.
| | | |
|---|---|---|
| *B32B 37/18* | (2006.01) | |
| *B29C 53/04* | (2006.01) | |
| *B29C 70/34* | (2006.01) | |
| *B32B 38/06* | (2006.01) | |
| *B29L 31/30* | (2006.01) | |

(52) U.S. Cl.
CPC .............. *B32B 37/18* (2013.01); *B29C 53/04* (2013.01); *B29C 70/345* (2013.01); *B32B 38/06* (2013.01); *B29L 2031/3076* (2013.01); *B32B 2250/03* (2013.01); *B32B 2305/02* (2013.01); *B32B 2605/18* (2013.01)

(58) Field of Classification Search
CPC ............ B32B 2605/18; B32B 2305/02; B32B 2250/03; B32B 38/06; B32B 37/18; B29L 2031/3076; B29C 70/345; B29C 53/04
See application file for complete search history.

(56) References Cited

U.S. PATENT DOCUMENTS

| | | | |
|---|---|---|---|
| 9,403,338 B2 | 8/2016 | Tuczek | |
| 10,525,636 B2 * | 1/2020 | Adams | ............... B29C 70/345 |
| 10,695,986 B2 * | 6/2020 | Gurney | .................. B32B 27/08 |
| 10,906,659 B2 | 2/2021 | Gurvich | |
| 11,014,331 B2 | 5/2021 | Gurvich | |
| 11,066,147 B2 | 7/2021 | Kruckenberg | |
| 11,117,344 B2 | 9/2021 | Martino-Gonzalez | |
| 11,242,822 B2 | 2/2022 | Gurvich | |
| 11,319,047 B2 | 5/2022 | Vélez De Mendizábal Alonso et al. | |
| 11,359,577 B2 | 6/2022 | Kruckenberg | |
| 2018/0290330 A1 * | 10/2018 | Caruel | ................. C04B 35/01 |
| 2019/0077093 A1 | 3/2019 | Tsotsis | |
| 2020/0386187 A1 | 12/2020 | Kelford | |

OTHER PUBLICATIONS

EP Search Report for EP Patent Application No. 23184001.8 dated Dec. 1, 2023.

* cited by examiner

*Primary Examiner* — Vishal I Patel (74) *Attorney, Agent, or Firm* — Getz Balich LLC (57) ABSTRACT

A formation method is provided during which a pattern is formed by folding a sheet of material. A first mold is formed by depositing mold material with the pattern. The pattern is separated from the first mold. A cellular core for a structured panel is formed by depositing core material with the first mold.

18 Claims, 14 Drawing Sheets

FORMING PATTERN FOR CELLULAR CORE BY FOLDING MATERIAL

This application claims priority to U.S. Patent Appln. No. 63/359,559 filed Jul. 8, 2022, which is hereby incorporated herein by reference in its entirety.

BACKGROUND

1. Technical Field

This disclosure relates generally to forming a structured panel such as an acoustic panel with a cellular core.

2. Background Information

An aircraft propulsion system may include an acoustic panel for attenuating noise. A typical acoustic panel includes a cellular core (e.g., a honeycomb core) located between and bonded to a perforated exterior skin and an interior skin. Various method are known in the art for forming such an acoustic panel. While these known formation methods have various benefits, there is still room in the art for improvement. There is a need in the art, in particular, for methods for rapidly forming a cellular core, particularly where the cellular core has complex and/or alternative (e.g., non-honeycomb) core configurations.

SUMMARY OF THE DISCLOSURE

According to an aspect of the present disclosure, a formation method is provided during which a pattern is formed by folding a sheet of material. A first mold is formed by depositing mold material with the pattern. The pattern is separated from the first mold. A cellular core for a structured panel is formed by depositing core material with the first mold.

According to another aspect of the present disclosure, another formation method is provided during which a first skin and a second skin are provided. A cellular core is formed. During the forming of the cellular core, a sheet of material is folded to provide a pattern and material is splashed against the pattern. The cellular core is arranged between the first skin and the second skin. The cellular core is bonded to the first skin and the second skin to form a structured panel.

According to still another aspect of the present disclosure, another formation method is provided during which a sheet of material is embossed to provide a plurality of fold lines. The sheet of material is folded along the fold lines to provide a pattern. The pattern includes a first sidewall, a second sidewall, a first endwall, a second endwall and a recess. The recess extends longitudinally within the pattern along the first sidewall and the second sidewall between the first endwall and the second endwall. The recess has a polygonal cross-sectional geometry. Material is deposited with the pattern to form an article. The article is separated from the pattern.

The sheet of material may be configured as or otherwise include sheet metal.

The pattern may also be formed by embossing the sheet of material to provide a plurality of fold lines. The sheet of material may be folded along the fold lines.

The formation method may also include constraining the pattern to provide the pattern with a predetermined configuration. The mold material may be deposited while the pattern is constrained.

The formation method may also include releasing constrainment of the pattern to facilitate the separating of the pattern from the first mold.

The mold material may be deposited with the pattern by splashing the mold material against the pattern.

The mold material may be configured as or otherwise include a polymer.

The mold material may be configured as or otherwise include a ceramic.

The core material may be configured as or otherwise include a polymer.

The core material may also include fiber-reinforcement embedded within the polymer.

The depositing of the core material may include laying up the core material onto the first mold.

The cellular core may also be formed by consolidating the core material under an elevated pressure and an elevated temperature.

The cellular core may also be formed by pressing the core material between the first mold and a second mold.

The formation method may also include: providing a first skin and a second skin; arranging the cellular core between the first skin and the second skin; and bonding the cellular core to the first skin and the second skin.

The structured panel may be configured as or otherwise include an acoustic panel configured as a component of an aircraft.

The pattern may include a plurality of recesses. A first of the recesses may have a triangular cross-sectional geometry.

The pattern may include a plurality of recesses. A first of the recesses may extend longitudinally through the pattern.

The pattern may include a plurality of recesses. At least a portion (or an entirety) of a first of the recesses (or each recess) may extend along a convoluted or otherwise non-straight trajectory within or through the pattern.

The pattern may include a first recess and a second recess longitudinally adjacent the first recess. The first recess may extend within the pattern along a first centerline. The second recess may extend within the pattern along a second centerline that is laterally offset from the first centerline.

The pattern may include a plurality of recesses and a plurality of endwalls. A first of the recesses may extend longitudinally within the pattern between a first of the endwalls and a second of the endwalls.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 10A-C are illustrations depicting select steps for forming the pattern with another configuration, where FIGS. 10A and 10B illustrate portions of a sheet of material being folded to form the pattern of FIG. 10C.

FIGS. 11A-C are illustrations depicting select steps for forming the pattern with another configuration, where FIGS. 11A and 11B illustrate portions of a sheet of material being folded to form the pattern of FIG. 11C.

FIGS. 12A-C are illustrations depicting select steps for forming the pattern with still another configuration, where FIGS. 12A and 12B illustrate portions of a sheet of material being folded to form the pattern of FIG. 12C.

DETAILED DESCRIPTION

Figure 1:
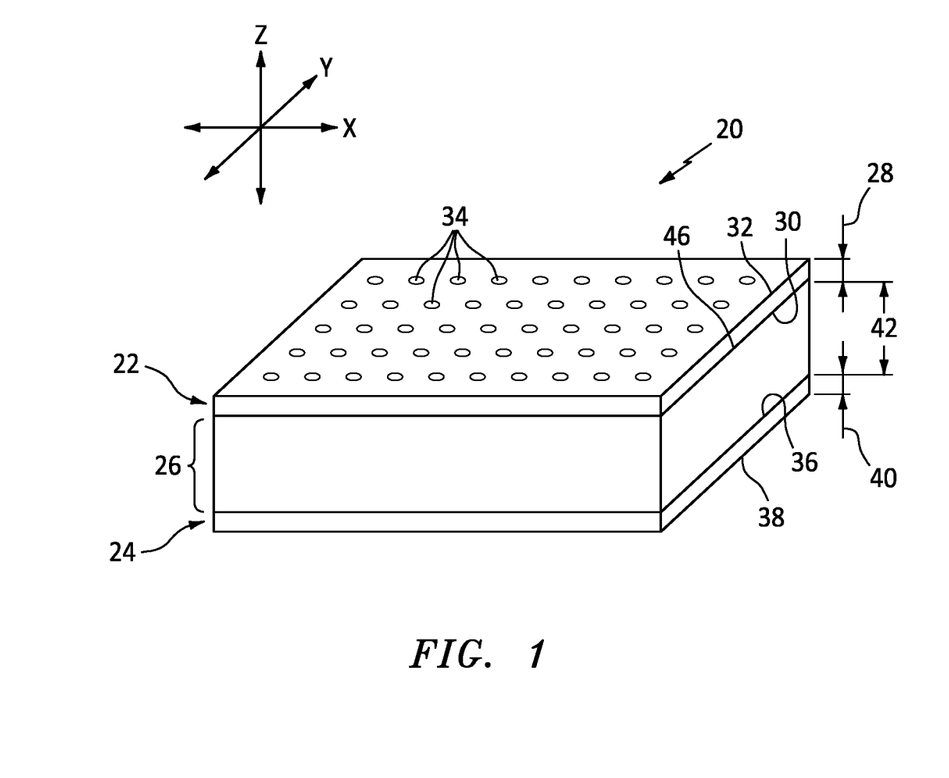
FIG. 1 is a partial perspective schematic illustration of a structured panel.

FIG. 1 is a partial perspective schematic illustration of a structured panel 20. This structured panel 20 may be an acoustic panel for attenuating sound; e.g., noise. The structured panel 20, for example, may be configured to attenuate sound generated by an aircraft propulsion system such as, for example, a turbofan propulsion system or a turbojet propulsion system. With such a configuration, the structured panel 20 may be part of a nacelle of the aircraft propulsion system. The structured panel 20, for example, may be configured as or may otherwise be included as part of an inner barrel, an outer barrel, a translating sleeve or a blocker door. Alternatively, the structured panel 20 may be included as part of another aircraft component/structure such as, for example, an aircraft fuselage, an aircraft wing or a pylon mounting the aircraft propulsion system to the aircraft fuselage or the aircraft wing. The structured panel 20, of course, may also or alternatively be configured to attenuate sound other than that generated by the aircraft propulsion system. It should also be understood, the structured panel 20 of the present disclosure is not limited to such exemplary structured panel configurations or applications.

The structured panel 20 extends longitudinally along an x-axis. The structured panel 20 extends laterally along a y-axis. The structured panel 20 extends vertically along a z-axis. Note, the term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the structured panel 20 may be curved and/or follow an undulating geometry. For example, the x-y plane and, thus, the structured panel 20 may be arcuate, cylindrical, conical, frustoconical, or tapered with or without radial undulations. In such embodiments, a solely vertical direction (e.g., z-axis direction) is defined relative to a position of interest on the x-y plane. For example, on a spherical x-y plane, the vertical direction (e.g., z-axis) direction is a radial direction.

The structured panel 20 of FIG. 1 includes a perforated first skin 22 (e.g., a face, front and/or exterior skin with one or more through-holes), a solid, non-perforated second skin 24 (e.g., a back and/or interior skin without any through-holes) and a structural cellular core 26 (e.g., a multi-layer corrugated core). Briefly, the cellular core 26 is arranged and extends vertically between the first skin 22 and the second skin 24. The cellular core 26 is also connected to the first skin 22 and/or the second skin 24. The cellular core 26, for example, may be welded, brazed, fused, adhered or otherwise bonded to the first skin 22 and/or the second skin 24.

The first skin 22 may be configured as a relatively thin sheet or layer of material that extends laterally and longitudinally along the x-y plane. This first skin material may include, but is not limited to, metal, polymer (e.g., thermoplastic or thermoset material), a fiber reinforced composite (e.g., fiber reinforcement such as, but not limited to, fiberglass fibers, carbon fibers and/or aramid fibers within a polymer matrix), or a combination thereof. The first skin 22 has a vertical thickness 28. This first skin vertical thickness 28 extends vertically between opposing side surfaces 30 and 32 of the first skin 22. The first skin 22 of FIG. 1 includes a plurality of perforations 34; e.g., apertures such as through-holes. Each of these perforations 34 extends generally vertically through the first skin 22 between the first skin side surfaces 30 and 32; see also FIG. 2.

The second skin 24 may be configured as a relatively thin sheet or layer of (e.g., continuous and uninterrupted) material that extends laterally and longitudinally along the x-y plane. This second skin material may include, but is not limited to, metal, polymer (e.g., thermoplastic or thermoset material), a fiber reinforced composite (e.g., fiber reinforcement such as, but not limited to, fiberglass fibers, carbon fibers and/or aramid fibers within a polymer matrix), or a combination thereof. The second skin material may be the same as or different than the first skin material. The second skin 24 has a vertical thickness 40. This second skin vertical thickness 40 extends vertically between opposing side surfaces 36 and 38 of the second skin 24. The second skin vertical thickness 40 may be substantially equal to or different (e.g., greater or less) than the first skin vertical thickness 28.

The cellular core 26 extends laterally and longitudinally along the x-y plane. The cellular core 26 has a vertical thickness 42. This core vertical thickness 42 extends vertically between opposing sides of the cellular core 26, which core sides are respectively abutted against the interior first skin side 30 and the interior second skin side 36. The core vertical thickness 42 may be substantially greater than the first skin vertical thickness 28 and/or the second skin vertical thickness 40. The core vertical thickness 42, for example, may be at least ten to forty times (10-40×), or more, greater than the vertical thickness 28, 40; however, the structured panel 20 of the present disclosure is not limited to such an exemplary embodiment.

Figure 2:
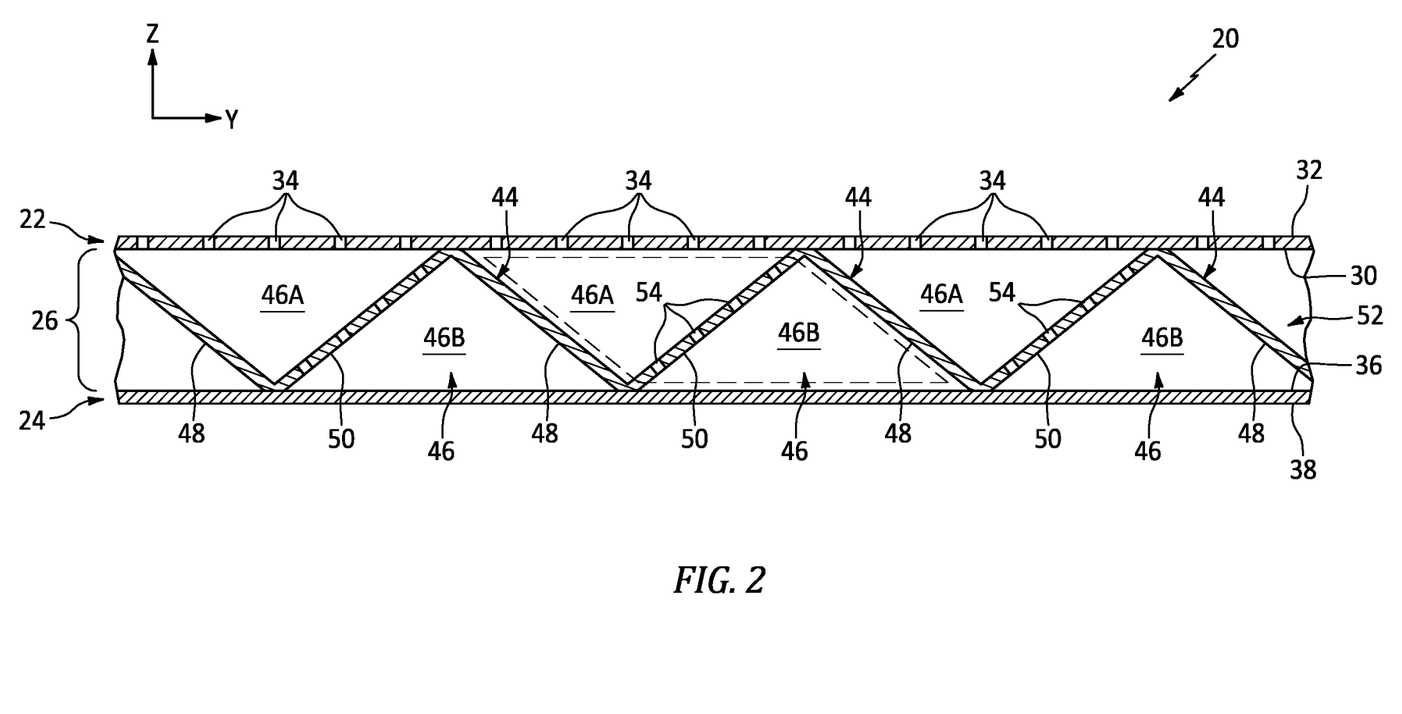
FIG. 2 is a partial side sectional illustration of the structured panel.

Referring to FIG. 2, the cellular core 26 includes a plurality of corrugations 44 forming a plurality of internal chambers 46 (e.g., acoustic resonance chambers, cavities, etc.) vertically between the first skin 22 and the second skin 24. Each of the corrugations 44 of FIG. 2 includes a first panel 48 and a second panel 50. Each of the internal chambers 46 of FIG. 2 extends vertically through the cellular core 26 between and to the first skin 22 and the second skin 24. Each of the internal chambers 46 may thereby be fluidly coupled with one or more respective first skin perforations 34. Each of the internal chambers 46 extends laterally within the cellular core 26 between a respective set of the first panels 48 of a laterally neighboring pair of the corrugations 44. Each of the internal chambers 46 extends longitudinally within the cellular core 26 along the respective set of the first panels 48.

The core panels 48 and 50 are arranged together and are interconnected (e.g., in a zig-zag pattern) to provide at least one corrugated ribbon 52 (or multiple corrugated ribbons 52). Each of the first panels 48 may be configured as a baffle. Each first panel 48 of FIG. 2, for example, is a fluid impermeable (e.g., non-perforated) segment of the corrugated ribbon 52. Each of the second panels 50 may be configured as a septum. Each second panel 50 of FIG. 2, for example, is a fluid permeable (e.g., perforated) segment of the corrugated ribbon 52. More particularly, each of the second panels 50 may include one or more panel perforations 54; e.g., apertures such as through-holes. Each of these panel perforations 54 extends through the respective second panel 50. The cellular core 26 of the present disclosure, however, is not limited to such an exemplary baffle-septum arrangement. For example, in other embodiments, each of core panels 48 and 50 may be configured as a septum. In still other embodiments, each of the core panels 48 and 50 may be configured as a baffle where, for example, the structured panel 20 is provided for non-sound attenuation purposes.

The first panels 48 are interspersed with the second panels 50. Each of the first panels 48 (unless configured at a lateral end of the cellular core 26), for example, is disposed and may extend laterally between and to a respective laterally neighboring pair of the second panels 50. Similarly, each of the second panels 50 (unless configured at a lateral end of the cellular core 26) is disposed and may extend laterally between and to a respective laterally neighboring pair of the first panels 48.

Figure 3:
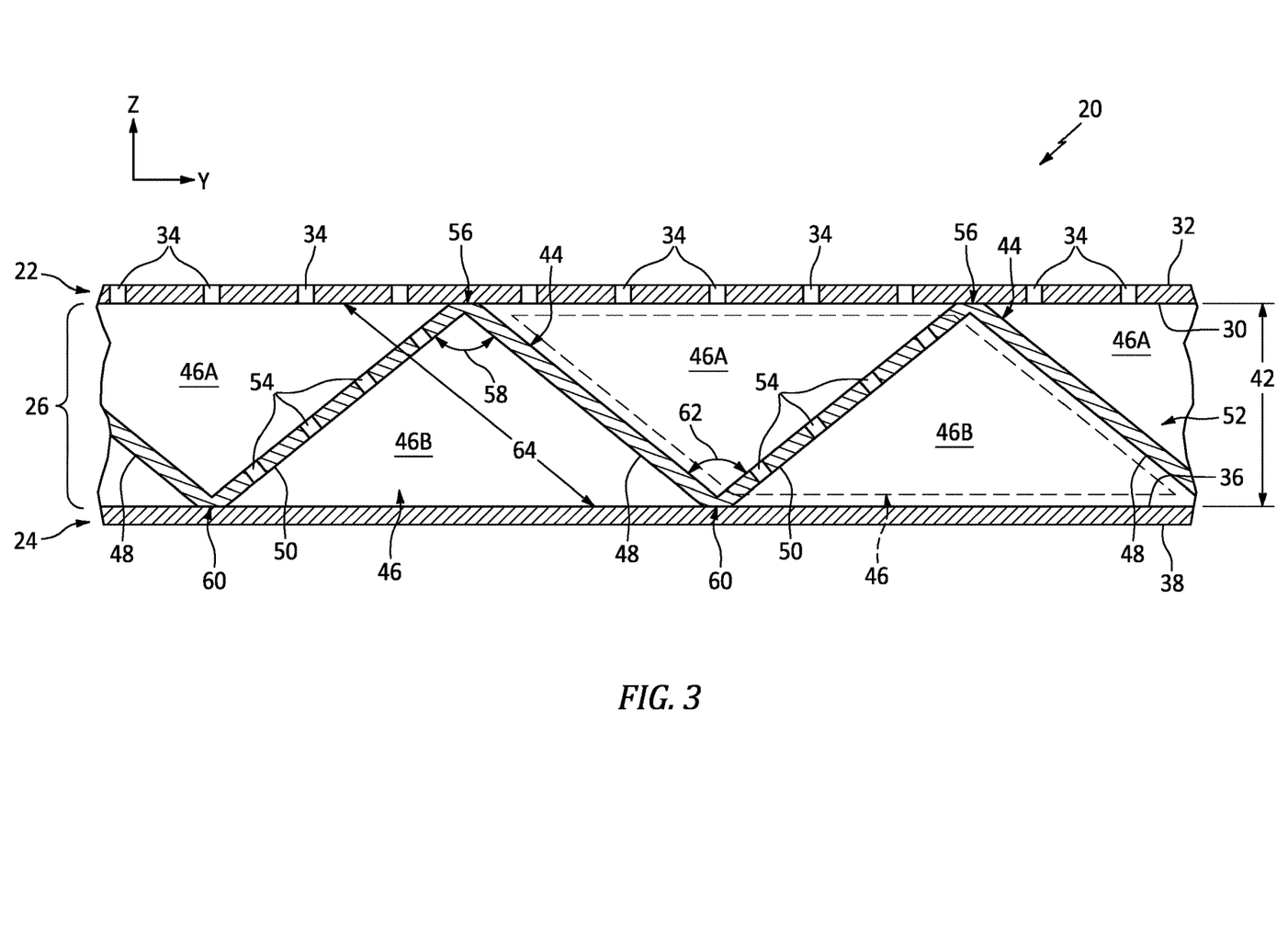
FIG. 3 is an enlarged side sectional illustration of a portion of the structured panel.
Figure 4:
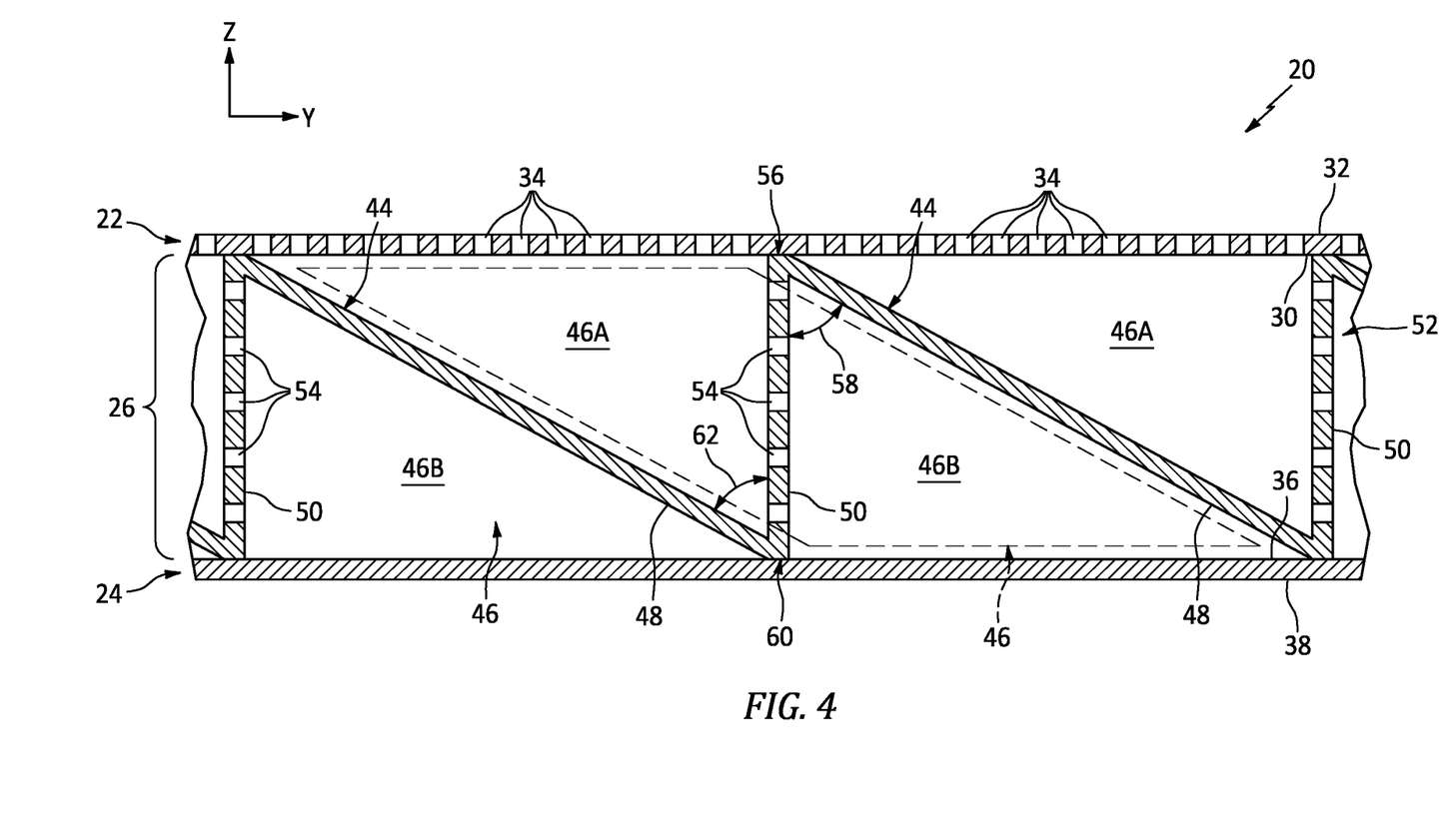
FIG. 4 is an enlarged side sectional illustration of a portion of the structured panel with another cellular core configuration.

Referring to FIG. 3, within the same corrugation 44, each first panel 48 is connected to and may meet a respective second panel 50 at a peak 56 adjacent the first skin 22. Each first panel 48, for example, extends to a first end thereof. Each second panel 50 extends to a first end thereof. Each first panel first end is (e.g., directly) connected to the first end of the second panel 50 in the same corrugation 44 at the first skin peak 56. The first panel 48 is angularly offset from the respective second panel 50 by an included angle 58; e.g., an acute angle, a right angle or an obtuse angle. This first skin peak angle 58 of FIG. 3, for example, may be between sixty degrees (60°) and one-hundred and twenty degrees (120°); e.g., ninety degrees (90°). In the specific embodiment of FIG. 3, the first skin peak angle 58 is selected and the respective first and second panels 48 and 50 are arranged such that those panels 48 and 50 both (e.g., equally) structurally support the first skin 22 in the vertical direction. The present disclosure, however, is not limited to such an exemplary first skin peak angle 58 nor first and second panel arrangement. The first skin peak angle 58 of FIG. 4, for example, may be between twenty degrees (20°) and seventy degrees (70°); e.g., thirty degrees (30°), forty-five degrees (45°), sixty degrees (60°). In the specific embodiment of FIG. 4, the first skin peak angle 58 is selected and the respective first and second panels 48 and 50 are arranged such that (e.g., substantially only) one of the panels 48 and 50 (e.g., the second panel 50) structurally supports the first skin 22 in the vertical direction.

Each first panel 48 of FIG. 3 is connected to and may meet the second panel 50 in a laterally neighboring corrugation 44 at a peak 60 adjacent the second skin 24. Each first panel 48, for example, extends to a second end thereof. Each second panel 50 extends to a second end thereof. Each first panel second end is (e.g., directly) connected to the second end of the second panel 50 in the laterally neighboring corrugation 44 at the second skin peak 60. The first panel 48 is angularly offset from the respective second panel 50 by an included angle 62; e.g., an acute angle, a right angle or an obtuse angle. This second skin peak angle 62 may be equal to or otherwise complementary with the first skin peak angle 58. The second skin peak angle 62 of FIG. 3, for example, may be between sixty degrees (60°) and one-hundred and twenty degrees (120°); e.g., ninety degrees (90°). In the specific embodiment of FIG. 3, the second skin peak angle 62 is selected and the respective first and second panels 48 and 50 are arranged such that those panels 48 and 50 both (e.g., equally) structurally support the second skin 24 in the vertical direction. The present disclosure, however, is not limited to such an exemplary second skin peak angle 62 nor first and second panel arrangement. The second skin peak angle 62 of FIG. 4, for example, may be between twenty degrees (20°) and seventy degrees (70°); e.g., thirty degrees (30°), forty-five degrees (45°), sixty degrees (60°). In the specific embodiment of FIG. 4, the second skin peak angle 62 is selected and the respective first and second panels 48 and 50 are arranged such that (e.g., substantially only) one of the panels 48 and 50 (e.g., the second panel 50) structurally supports the second skin 24 in the vertical direction.

Each corrugation 44 at its first skin peak 56 of FIG. 3 radially engages (e.g., contacts) and is connected (e.g., bonded) to the first skin 22. Each corrugation 44 at its second skin peak 60 of FIG. 3 radially engages (e.g., contacts) and is connected (e.g., bonded) to the second skin 24. With this arrangement, each of the corrugations 44 extends across the vertical thickness 42 of the cellular core 26 between the first skin 22 and the second skin 24. The corrugated ribbon 52 may thereby divide each internal chamber 46 into a first sub-chamber 46A (e.g., cavity) and a corresponding second sub-chamber 46B (e.g., cavity). The first sub-chambers 46A of FIG. 3 are located within the cellular core 26 on the first skin side of the corrugated ribbon 52. The second sub-chambers 46B are located within the cellular core 26 on the second skin side of the corrugated ribbon 52. Each of the second sub-chambers 46B is fluidly coupled with a respective one of the first sub-chambers 46A through the panel perforation(s) 54 in a respective one of the second panels 50. Thus, each of the second sub-chambers 46B is fluidly coupled with respective first skin perforation(s) 34 through the respective first sub-chamber 46A.

With the foregoing configuration, each of the internal chambers 46 of FIG. 3 may have a length 64 within the cellular core 26 that is longer than the core vertical thickness 42. This may facilitate tuning the cellular core 26 and, more generally, the structured panel 20 for attenuating sound (e.g., noise) with relatively low frequencies without changing (e.g., proportionally increasing) the overall vertical height 42 of the cellular core 26 and, thus, the structured panel 20 as may be required, for example, for a traditional acoustic panel with a honeycomb core. The structured panel 20 of the present disclosure, however, is not limited to such an exemplary relationship.

Figure 5:
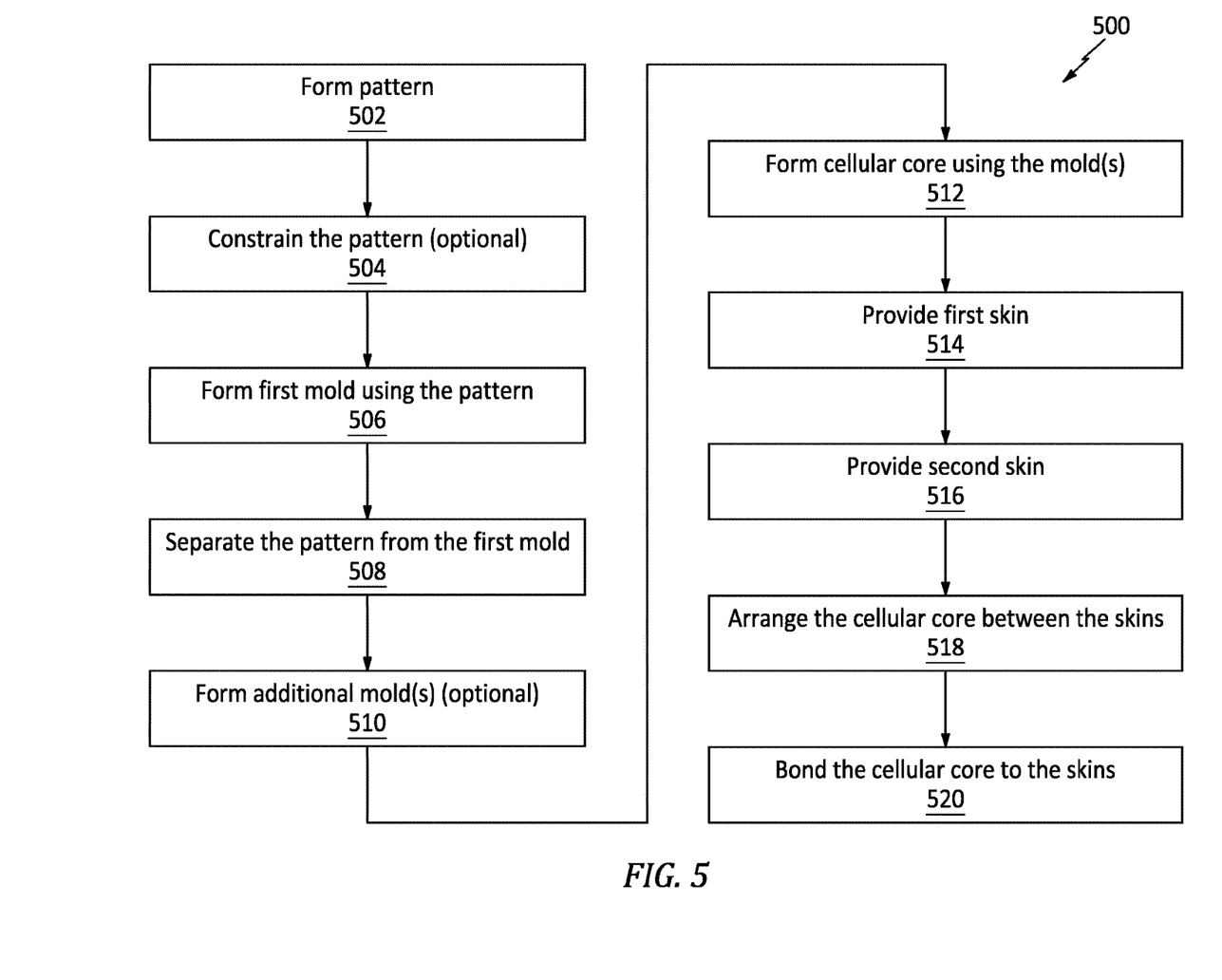
FIG. 5 is a flow diagram of a method for forming a structured panel.

FIG. 5 is a flow diagram of a method 500 for forming a structured panel. For ease of description, the formation method 500 is described with respect to forming the structured panel 20. The formation method 500 of the present disclosure, however, is not limited to forming any particular structure panel types or configurations.

Figure 6A:
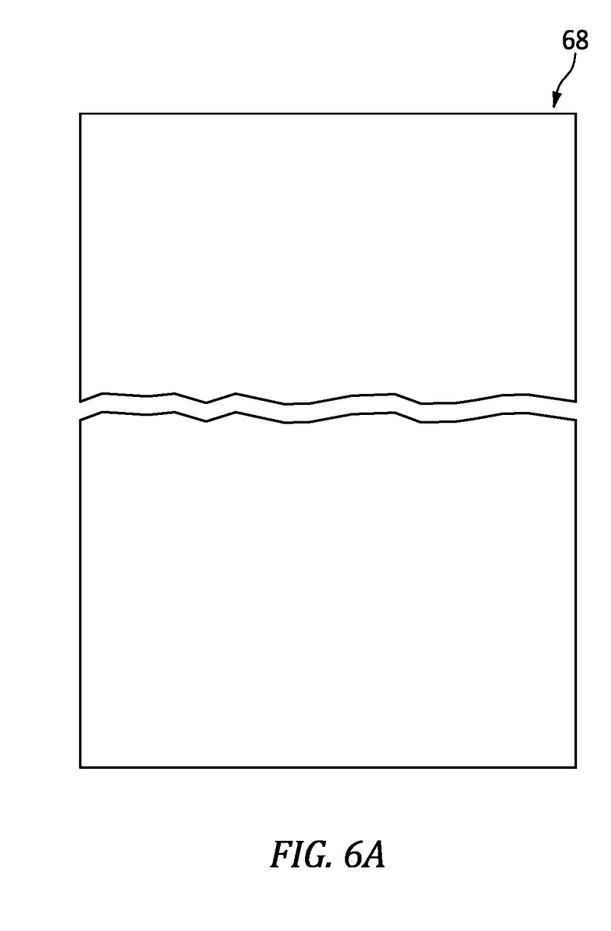
FIGS. 6A-C are illustrations depicting select steps for forming a pattern.
Figure 6B:
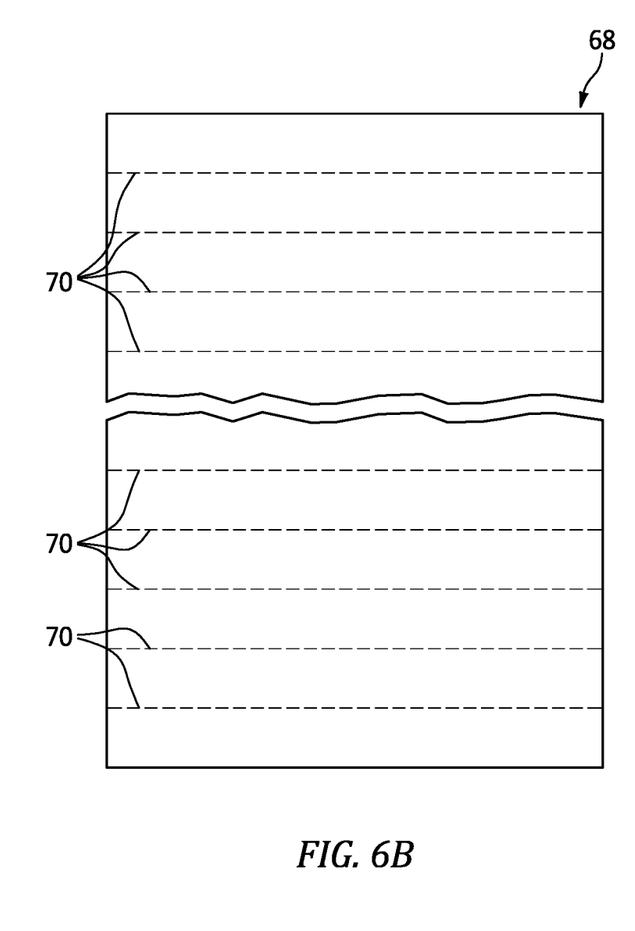
Figure 6C:
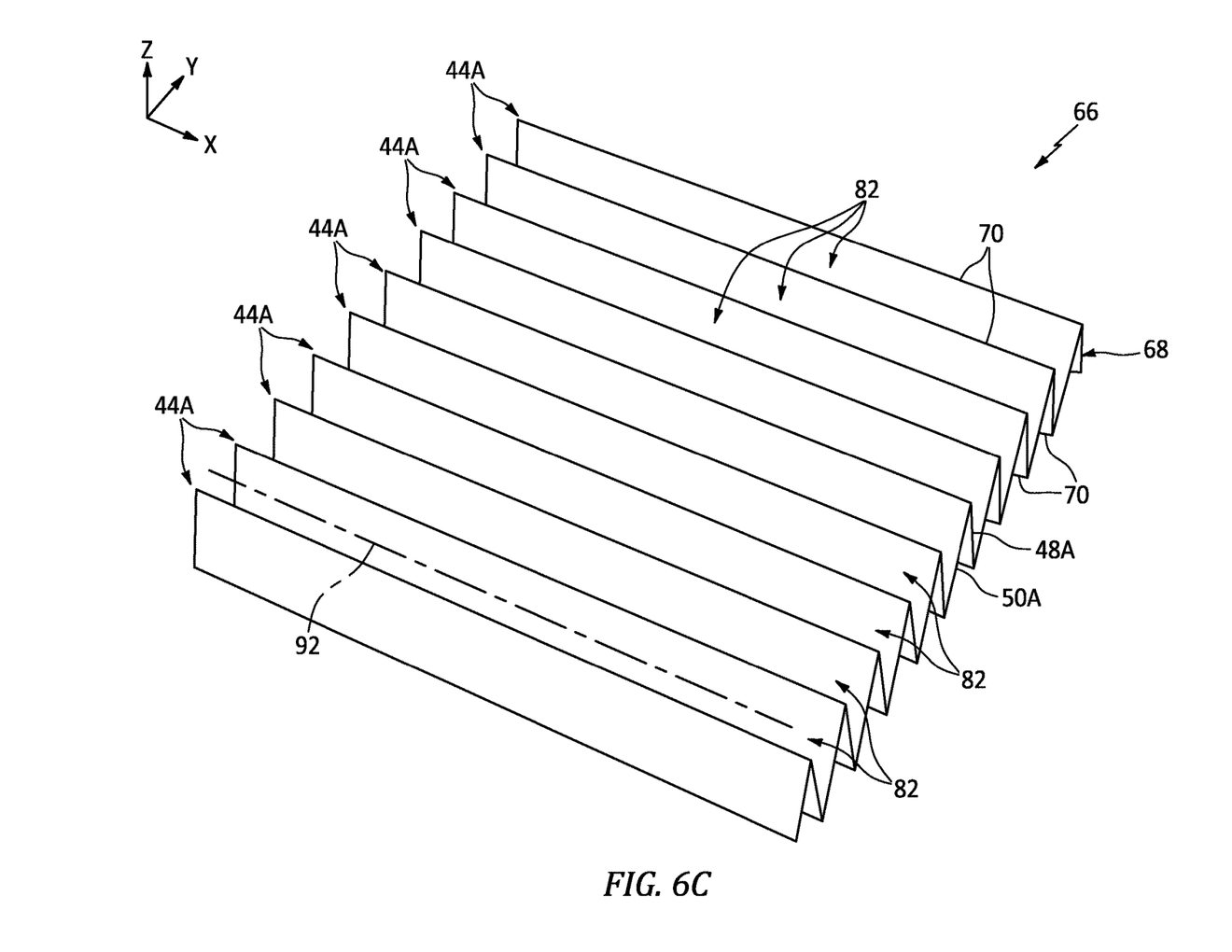

In step 502, referring also to FIGS. 6A-C, a mold pattern 66 is formed. For example, referring to FIG. 6A, a sheet of material 68 is provided. This sheet of material 68 may be constructed from metal; e.g., the sheet of material 68 may be sheet metal. Alternatively, the sheet of material 68 may be constructed from a non-metal such as, for example, a polymer (e.g., thermoplastic) or any other suitable (e.g., foldable, relatively stiff) material. Referring to FIG. 6B, the sheet of material 68 may be embossed (e.g., e.g., stamped, perforated, scored, etc.) to provide a plurality of fold lines 70. Referring to FIG. 6C, the sheet of material 68 is folded (e.g., bent) using, for example, a bending brake, a die and/or one or more other folding tools to provide the pattern 66. The (e.g., embossed) sheet of material 68, for example, is folded along the fold lines 70. Alternatively, the sheet of material 68 may be folded without use of the embossed fold lines 70 in other embodiments. Once the sheet of material 68 has been folded, the pattern 66 and the cellular core 26 (e.g., see FIGS. 2 and 3) to be formed using the pattern 66 may have substantially or exactly a common (e.g., the same) configuration; e.g., shape, size, features, etc. For example, the pattern 66 may be a substantial replica of the cellular core 26 without, for example, the panel perforations 54 (when included in the cellular core 26). Using this folding process, the pattern 66 may be rapidly manufactured with relatively little expense compared to a traditional pattern casting and/or machining forming process. It is contemplated, however, that the folded pattern 66 may also be paired with a cast, machined and/or otherwise formed pattern and/or feature(s).

Figure 7:
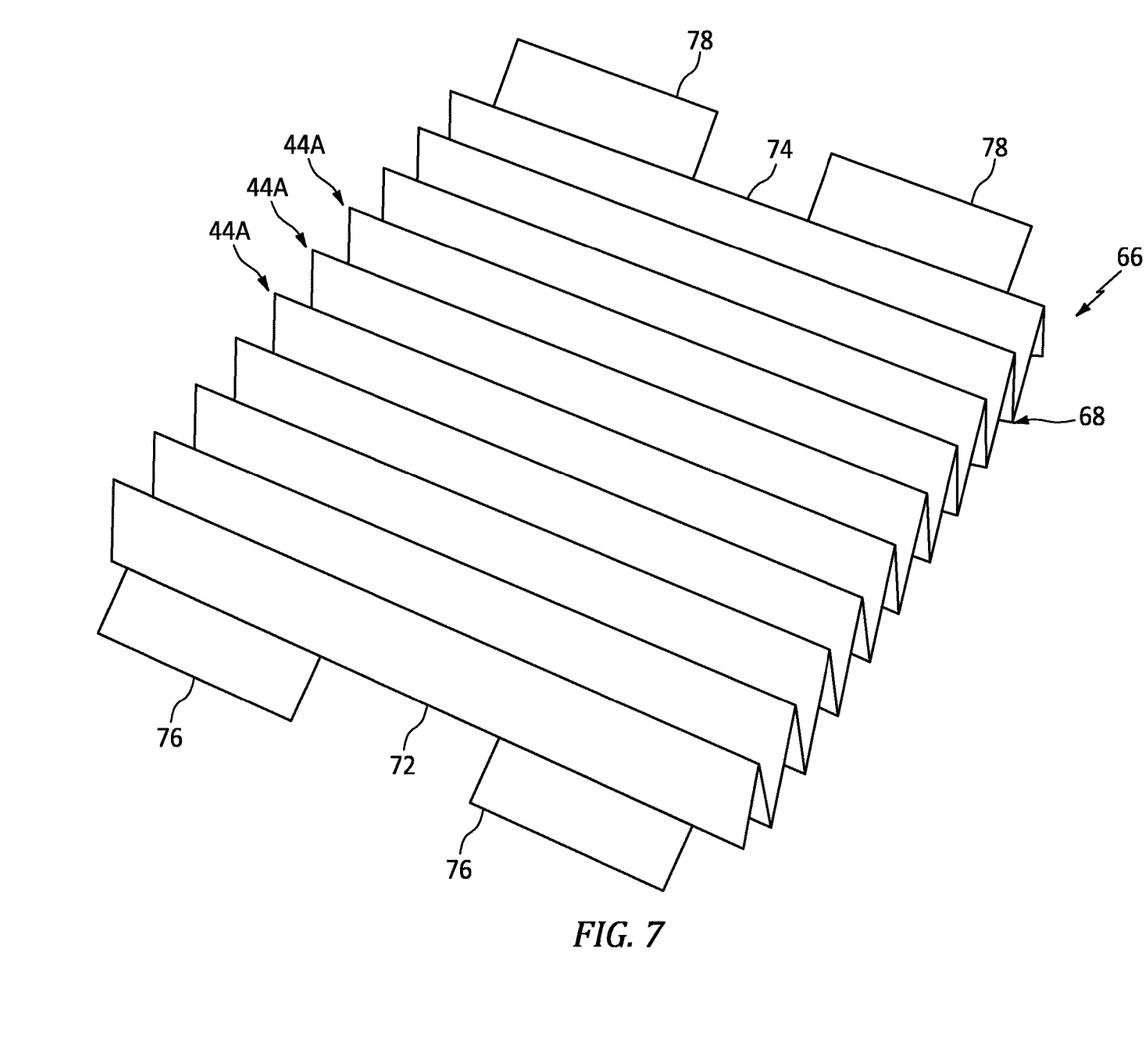
FIG. 7 is a perspective illustration of the pattern arranged with pattern constraints.

In step 504, referring also to FIG. 7, the pattern 66 may be constrained as needed. The material of the pattern 66, for example, may have a certain degree of resiliency. As a result, the folded sheet of material 68 forming the pattern 66 may slightly spring back to a slightly unfolded state. This resiliency may be accommodated by constraining the pattern 66. The lateral ends 72 and 74 of the pattern 66, for example, may be pressed (e.g., compressed) laterally together using one or more constraints 76 and 78 and/or otherwise manipulated to provides the pattern 66 with its predetermined configuration; e.g., the configuration of the cellular core 26. Of course, one or more individual pattern corrugations 44A or sets of the pattern corrugations 44A may also or alternatively be laterally or otherwise manipulated to provide the pattern 66 with its predetermined configuration. In addition or alternatively, the sheet of material 68 may be overfolded during the pattern formation step 502 such that in its slightly unfolded (e.g., relaxed) state the pattern 66 has its predetermined configuration.

Figure 8A:
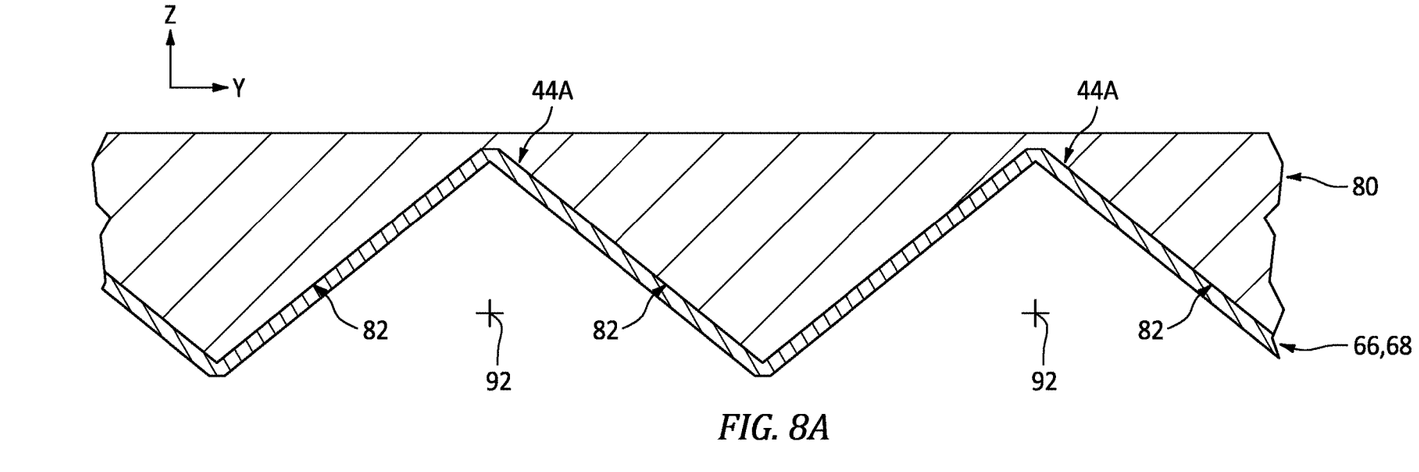
FIGS. 8A and 8B are illustration depicting select steps for forming a mold.
Figure 8B:
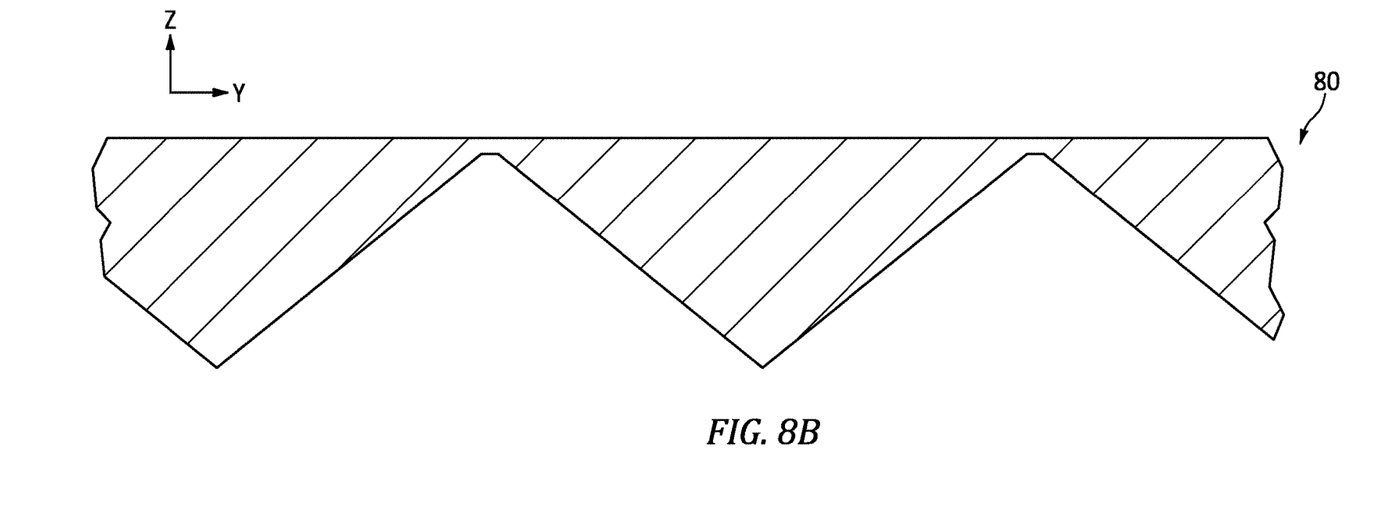

In step 506, referring also to FIGS. 8A and 8B, a first mold 80 is formed using the pattern 66. For example, referring to FIG. 8A, mold material is deposited with (e.g., splashed against) the pattern 66 to make an inverse mold (e.g., a negative) of a respective (e.g., a top) side of the pattern 66; see also FIG. 8B. The mold material, for example, may at least partially or completely fill one or more recesses 82 (see also FIG. 6C) (e.g., channels, depressions, etc.) and/or any other apertures in the pattern 66. The depositing may be performed via coating (e.g., spraying), dipping and/or various other known deposition techniques. The mold material may be or otherwise include a polymer; e.g., thermoplastic or thermoset material. Alternatively, the mold material may be or otherwise include a ceramic or any other suitable material.

In step 508, the pattern 66 is separated from the first mold 80. For example, where the pattern 66 is constrained during the optional step 504, the pattern 66 may be released; e.g., unconstrained. The pattern 66 may then by pulled away from (or otherwise manipulated) to disengage the pattern 66 from the first mold 80. To facilitate the separation of the pattern 66 from the first mold 80, the pattern 66 may be coated with a release agent prior to the first mold formation step 506.

Figure 9:
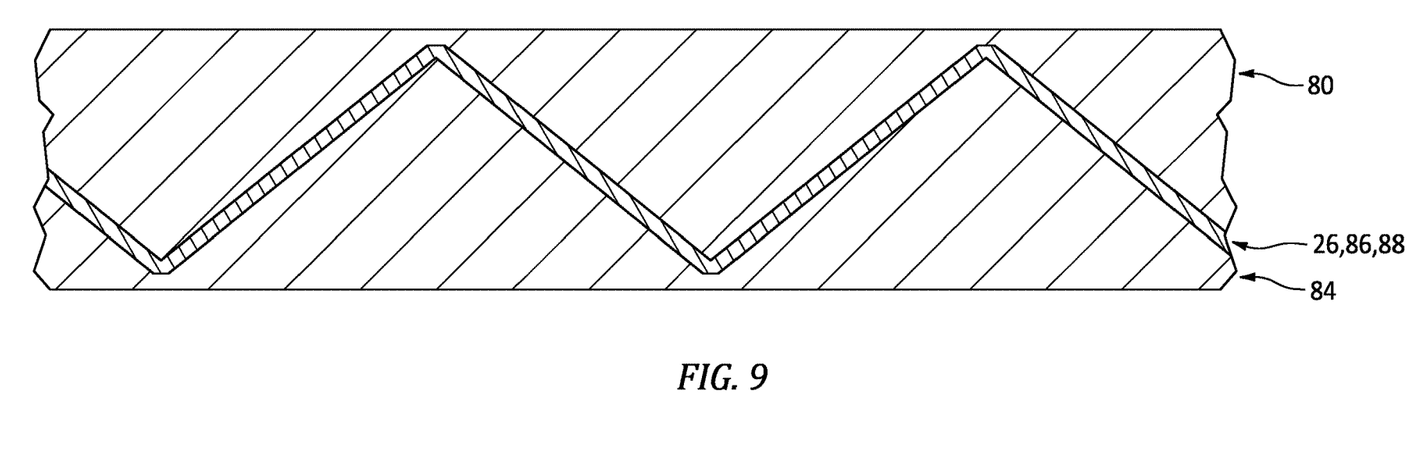
FIG. 9 is a partial side sectional illustration of core material between a set of molds.

In step 510, a second mold 84 may be formed (e.g., see FIG. 9). This second mold 84 may be formed by repeating the mold formation step 506 on a back side of the pattern 66. Alternatively, the second mold 84 may be formed following formation of a new pattern; e.g., repeating steps 502, 504, 506.

In step 512, referring also to FIG. 9, the cellular core 26 is formed. Core material 86, for example, may be deposited with the first mold 80 and/or the second mold 84. This core material 86 may be or otherwise include a polymer; e.g., a thermoplastic or a thermoset. The core material 86 may also include fiber-reinforcement embedded within the polymer; e.g., a polymer matrix. Examples of the fiber-reinforcement include, but are not limited to, fiberglass fibers, carbon fibers and/or aramid fibers. The present disclosure, however, is not limited to the foregoing exemplary core materials.

The core material 86 may be manually laid up, placed using an automated fiber/tape placement (AFP/ATP) device and/or otherwise disposed with the respective mold(s) 80, 84. The core material 86 may be pressed between the first mold 80 and the second mold 84 and/or otherwise compressed against the respective mold(s) 80, 84 (e.g., using a vacuum bag, etc.). The core material 86 may also be heated. The core material 86 may thereby be consolidated together under an elevated pressure and/or an elevated temperature to form a preform 88 of the cellular core 26. This core preform 88 may be separated (e.g., released) from the respective mold(s) 80, 84. The core preform 88 may then be machined, trimmed and/or otherwise finished to provide the cellular core 26. The core preform 88, for example, may be perforated (e.g., drilled, laser ablated, punched, etc.) to form the panel perforations 54 (e.g., see FIG. 3) when included.

In step 514, the first skin 22 is provided.

In step 516, the second skin 24 is provided.

In step 518, the cellular core 26 is arranged vertically between the first skin 22 and the second skin 24.

In step 520, the cellular core 26 is bonded (e.g., welded, adhered, etc.) to the first skin 22 and the second skin 24 to form the structured panel 20.

Figure 10A:
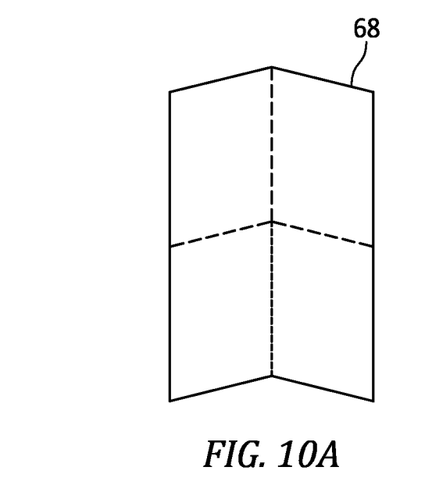
Figure 10B:
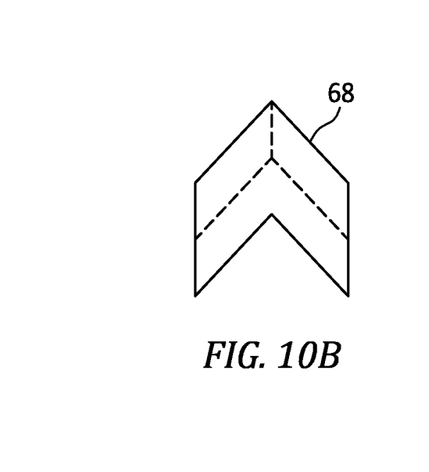

The pattern 66 and, thus, the cellular core 26 may have various configurations other than that described above. For example, any one or more or all of the folds and, thus, the resulting corrugation(s) 44 may extend longitudinally along the x-axis. Any one or more or all of the folds/corrugation(s) 44 may also or alternatively extend laterally along the y-axis. Any one or more or all of the folds/corrugation(s) 44 may still also or alternatively extend diagonally (or otherwise) within the x-y plane. Some or all of the folds/corrugation(s) 44 may be parallel with one another. Alternatively, some of the folds/corrugation(s) 44 may be angularly offset from one another (e.g., perpendicular or acutely angled to one another) to provide a variable (e.g., bumpy) topography in multiple directions along the x-y plane. Examples of such alternative configurations include, but not limited to, the patterns 66/cellular cores 26 shown in FIGS. 10C, 11C and 12C. The pattern 66 of FIG. 10C may be formed using the exemplary folding technique partially depicted in FIGS. 10A and 10B. The pattern 66 of FIG. 11C may be formed using the exemplary folding technique partially depicted in FIGS. 11A and 11B. The pattern 66 of FIG. 12C may be formed using the exemplary folding technique partially depicted in FIGS. 12A and 12B.

Figure 10C:
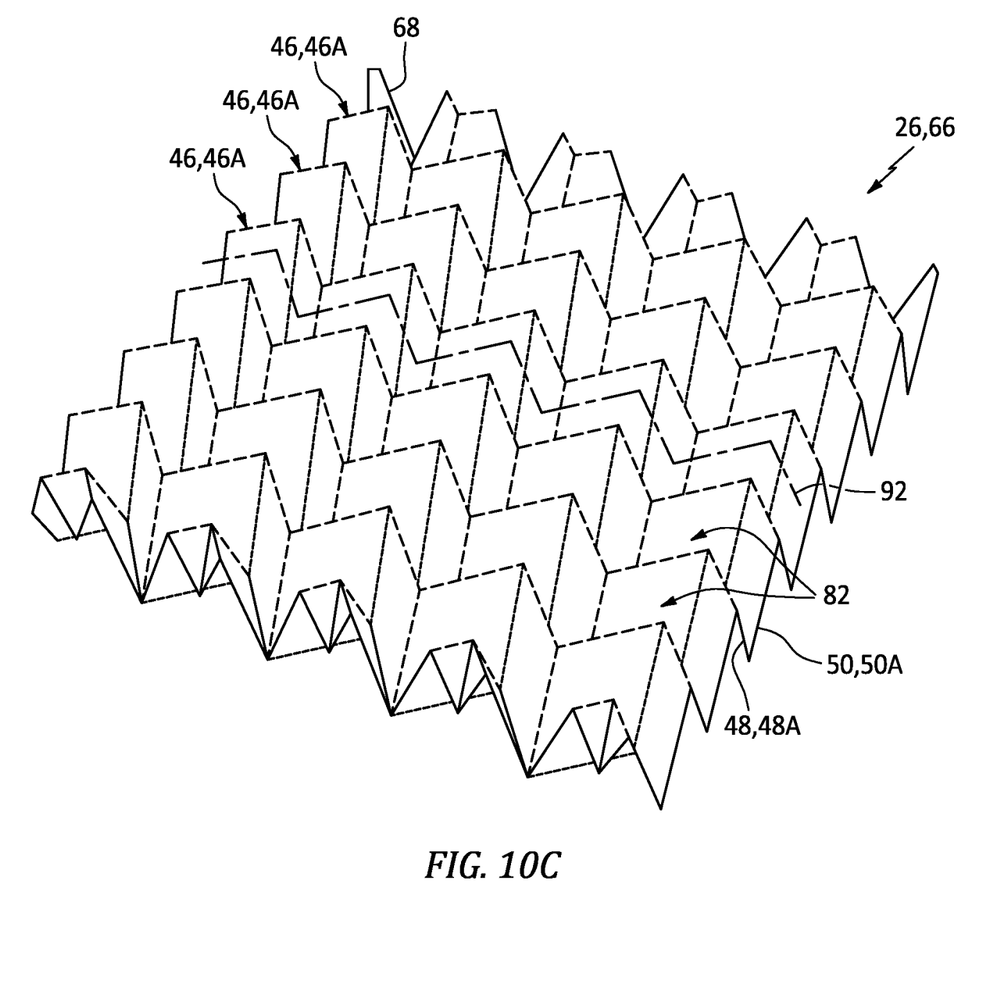
Figure 11A:
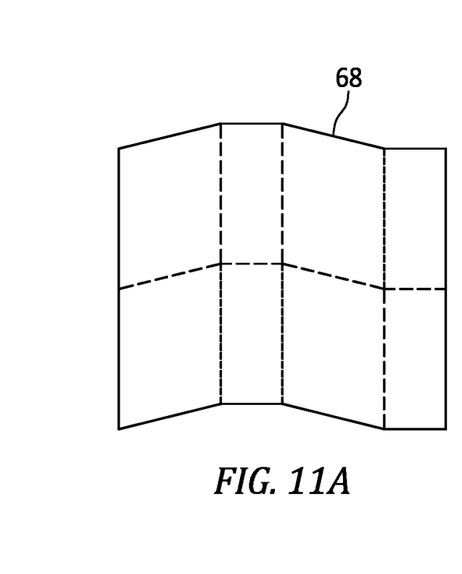
Figure 11B:
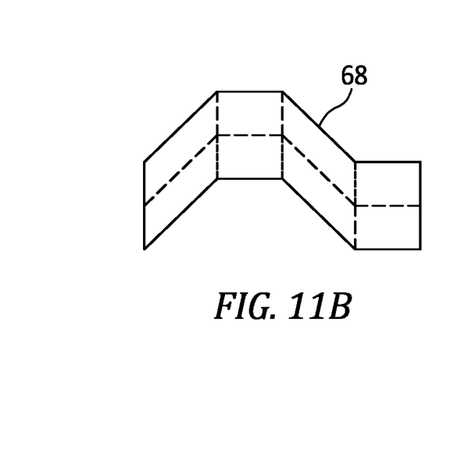
Figure 11C:
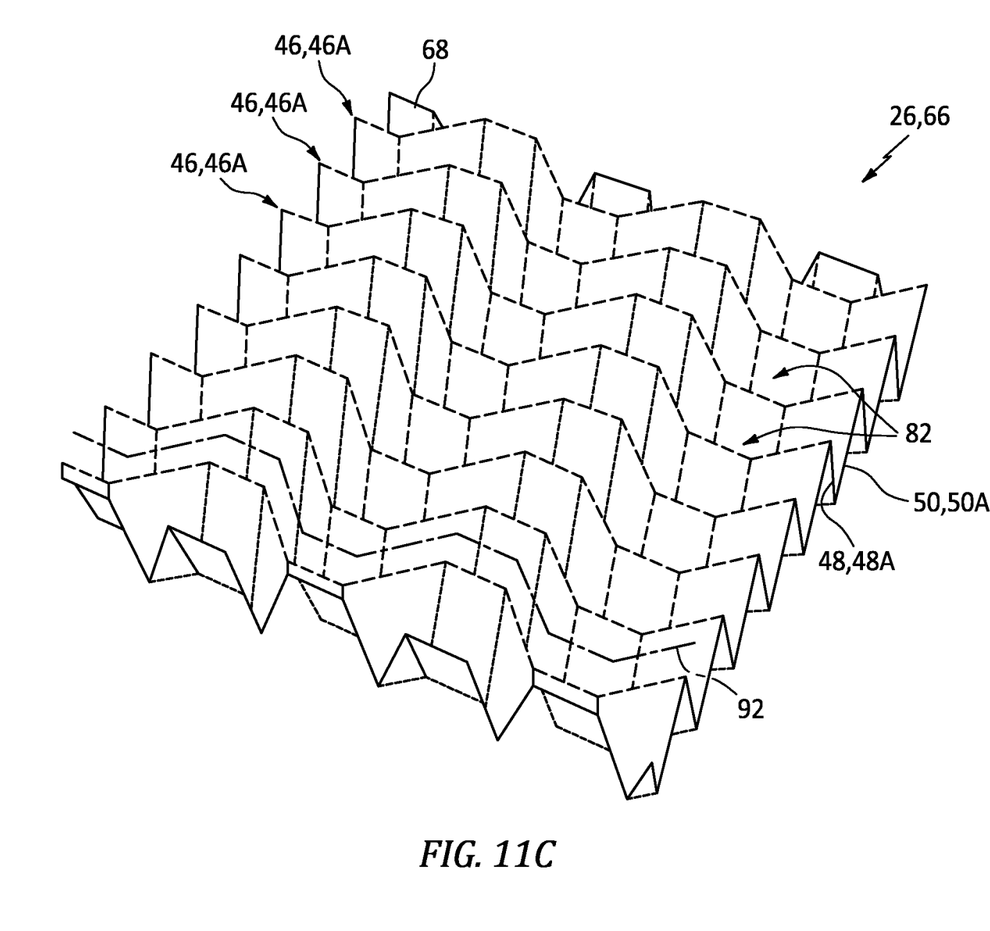
Figure 12A:
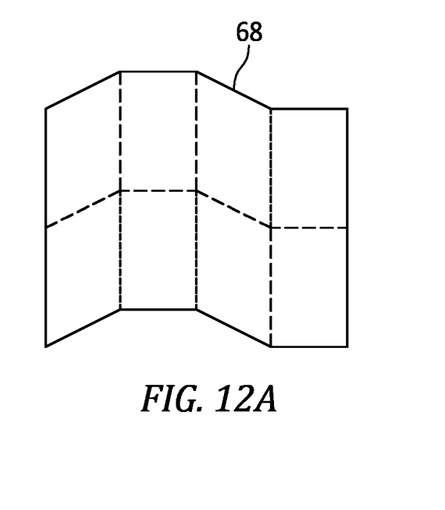
Figure 12B:
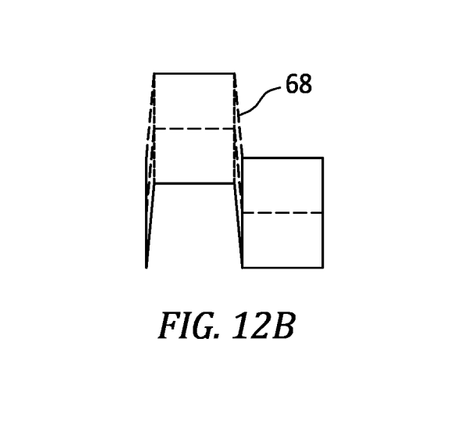
Figure 12C:
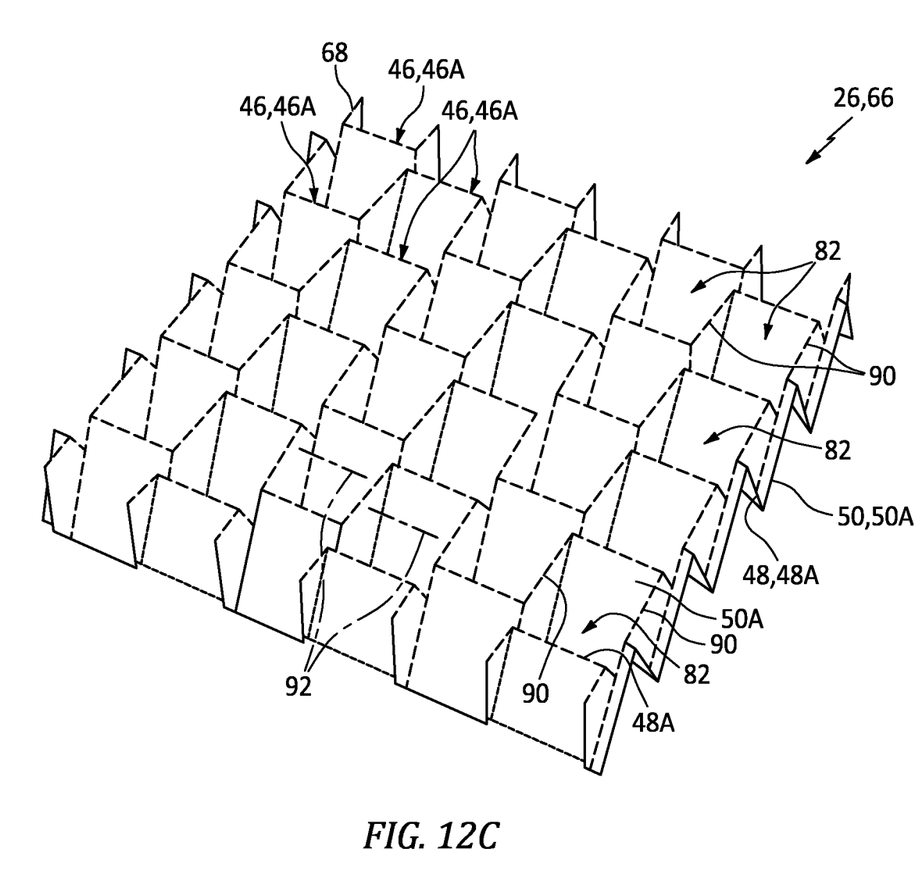

In some embodiments, referring to FIGS. 6C, 10C, 11C and 12C, each recess 82 may project vertically (e.g., partially) into the pattern 66. Each recess 82 may extend laterally within the pattern 66 between a respective laterally adjacent pair of the pattern panels 48A, 50A; e.g., sidewalls. Referring to FIGS. 6C, 10C and 11C, each recess 82 may extend longitudinally through the pattern 66 along the respective pair of pattern panels 48A, 50A. Alternatively, referring to FIG. 12C, one or more or all of the recesses 82 may each extend longitudinally within the pattern 66 between a respective longitudinally adjacent pair of pattern endwalls 90; e.g., stringers, etc. As each recess 82 of FIGS. 6C, 10C, 11C and 12C extends longitudinally within/through the pattern 66, that recess 82 may follow a recess trajectory 92; e.g., a centerline of the respective recess 92. Referring to FIGS. 6C and 12C, at least a portion or an entirety of the recess trajectory 92 may be straight. Alternatively, referring to FIGS. 10C and 11C, at least a portion or an entirety of the recess trajectory 92 may be non-straight; e.g., convoluted (e.g., zig-zagged, sinusoidal, wavy, etc.), bent, curved, etc. In some embodiments, referring to FIG. 12C, the recess trajectories 92 of longitudinally neighboring recesses 82 may be laterally misaligned; e.g., offset. These misaligned recess trajectories 92 may be parallel with one another or angularly offset from one another.

Figure 13A:
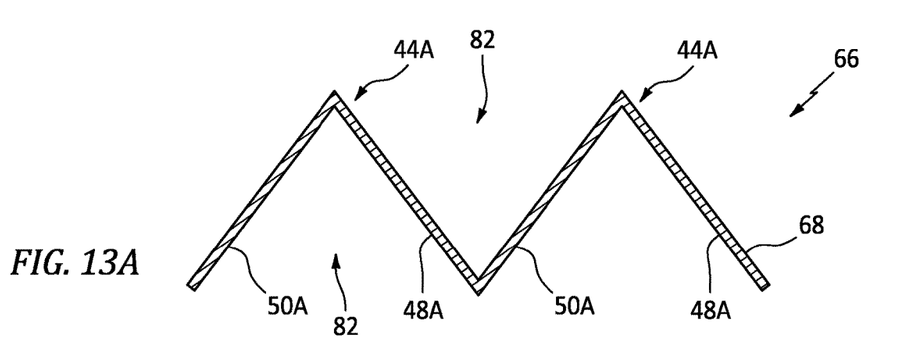
FIGS. 13A-C are partial side sectional illustrations of the pattern with various recess cross-sectional geometries.
Figures 13B, 13C:
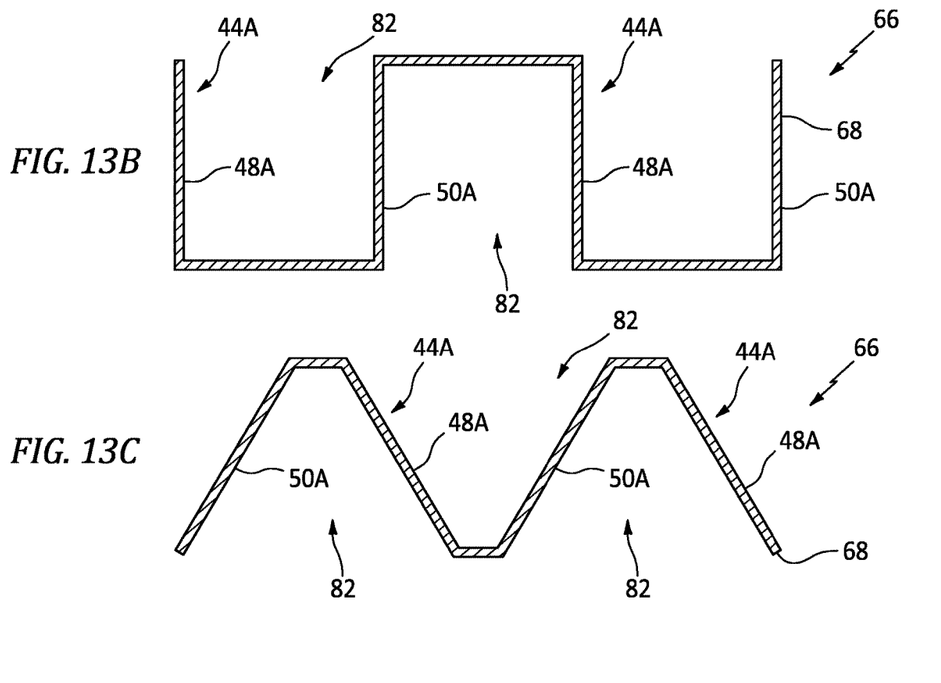

In some embodiments, referring to FIG. 13A-C, one or more or all of the recesses 82 may each have a polygonal cross-sectional geometry when viewed, for example, in a reference plane perpendicular to the pattern panels 48A, 50A forming the respective recess 82. Examples of the polygonal cross-sectional geometry include, but are not limited to, a triangular cross-sectional geometry (e.g., see FIG. 13A), a rectangular cross-sectional geometry (e.g., see FIG. 13B) and a trapezoidal cross-sectional geometry (e.g., see FIG. 13C).

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A formation method, comprising:
   forming a pattern by folding a sheet of material;
   forming a first mold by depositing mold material with the pattern;
   separating the pattern from the first mold; and
   forming a cellular core for a structured panel by depositing core material with the first mold.

2. The formation method of claim 1, wherein the sheet of material comprises sheet metal.

3. The formation method of claim 1, wherein
   the pattern is further formed by embossing the sheet of material to provide a plurality of fold lines; and
   the sheet of material is folded along the fold lines.

4. The formation method of claim 1, further comprising:
   constraining the pattern to provide the pattern with a predetermined configuration;
   wherein the mold material is deposited while the pattern is constrained.

5. The formation method of claim 4, further comprising releasing constrainment of the pattern to facilitate the separating of the pattern from the first mold.

6. The formation method of claim 1, wherein the mold material is deposited with the pattern by splashing the mold material against the pattern.

7. The formation method of claim 1, wherein the mold material comprises a polymer or a ceramic.

8. The formation method of claim 1, wherein the core material comprises a polymer.

9. The formation method of claim 8, wherein the core material further comprises fiber-reinforcement embedded within the polymer.

10. The formation method of claim 1, wherein the depositing of the core material comprises laying up the core material onto the first mold.

11. The formation method of claim 1, wherein the cellular core is further formed by consolidating the core material under an elevated pressure and an elevated temperature.

12. The formation method of claim 1, wherein the cellular core is further formed by pressing the core material between the first mold and a second mold.

13. The formation method of claim 1, further comprising:
    providing a first skin and a second skin;
    arranging the cellular core between the first skin and the second skin; and
    bonding the cellular core to the first skin and the second skin.

14. The formation method of claim 1, wherein the structured panel comprises an acoustic panel configured as a component of an aircraft.

15. The formation method of claim 1, wherein
    the pattern comprises a plurality of recesses; and
    a first of the plurality of recesses has a triangular cross-sectional geometry.

16. The formation method of claim 1, wherein
    the pattern comprises a plurality of recesses; and
    at least a portion of a first of the plurality of recesses extends along a convoluted trajectory within or through the pattern.

17. The formation method of claim 1, wherein
    the pattern comprises a first recess and a second recess longitudinally adjacent the first recess;
    the first recess extends within the pattern along a first centerline; and
    the second recess extends within the pattern along a second centerline that is laterally offset from the first centerline.

18. The formation method of claim 1, wherein
    the pattern comprises a plurality of recesses and a plurality of endwalls; and
    a first of the plurality of recesses extends longitudinally within the pattern between a first of the plurality of endwalls and a second of the plurality of endwalls.

* * * * *